United States Patent
Pylvaenaeinen et al.

(10) Patent No.: US 10,936,920 B2
(45) Date of Patent: Mar. 2, 2021

(54) DETERMINING GEOGRAPHICAL MAP FEATURES WITH MULTI-SENSOR INPUT

(71) Applicant: Uber Technologies, Inc., San Francisco, CA (US)

(72) Inventors: Timo Pekka Pylvaenaeinen, Menlo Park, CA (US); Aditya Sarawgi, San Francisco, CA (US); Vijay Mahadevan, San Francisco, CA (US); Vasudev Parameswaran, Fremont, CA (US); Mohammed Waleed Kadous, Santa Clara, CA (US)

(73) Assignee: Uber Technologies, Inc., San Francisco, CA (US)

( * ) Notice: Subject to any disclaimer, the term of this patent is extended or adjusted under 35 U.S.C. 154(b) by 68 days.

(21) Appl. No.: 16/443,305

(22) Filed: Jun. 17, 2019

(65) Prior Publication Data

US 2019/0385010 A1    Dec. 19, 2019

Related U.S. Application Data

(60) Provisional application No. 62/686,086, filed on Jun. 17, 2018.

(51) Int. Cl.
| | | |
|---|---|---|
| G06K 9/46 | (2006.01) |
| G06K 9/66 | (2006.01) |
| G06K 9/62 | (2006.01) |
| G06N 3/02 | (2006.01) |
| G06F 17/16 | (2006.01) |
| G06F 16/29 | (2019.01) |

(52) U.S. Cl.
CPC ............. *G06K 9/629* (2013.01); *G06F 16/29* (2019.01); *G06F 17/16* (2013.01); *G06K 9/6218* (2013.01); *G06K 9/6256* (2013.01); *G06N 3/02* (2013.01)

(58) Field of Classification Search
CPC .... G06K 9/629; G06K 9/6218; G06K 9/6256; G06F 16/29; G06F 17/16; G06N 3/02
USPC .......................................................... 382/190
See application file for complete search history.

(56) References Cited

U.S. PATENT DOCUMENTS

| | | | | |
|---|---|---|---|---|
| 7,728,833 B2 * | 6/2010 | Verma | ..................... | G06T 17/20 345/420 |
| 9,986,154 B2 * | 5/2018 | Chen | ...................... | G06T 11/60 |
| 2006/0061566 A1 * | 3/2006 | Verma | ..................... | G06T 17/20 345/419 |

(Continued)

*Primary Examiner* — Marceau Milord
(74) *Attorney, Agent, or Firm* — Fenwick & West LLP (57) ABSTRACT

A system trains and applies a machine learning model to label maps of a region. Various data modalities are combined as inputs for multiple data tiles used to characterize a region for a geographical map. Each data modality reflects sensor data captured in different ways. Some data modalities include aerial imagery, point cloud data, and location trace data. The different data modalities are captured independently and then aggregated using machine learning models to determine map labeling information about tiles in the region. Data is ingested by the system and corresponding tiles are identified. A tile is represented by a feature vector of different data types related to the various data modalities, and values from the ingested data are added to the feature vector for the tile. Models can be trained to predict characteristics of a region using these various types of input.

17 Claims, 6 Drawing Sheets

(56) References Cited

U.S. PATENT DOCUMENTS

| | | | |
|---|---|---|---|
| 2015/0341552 A1* | 11/2015 | Chen | G06T 17/00 |
| | | | 348/38 |
| 2017/0132334 A1* | 5/2017 | Levinson | G06F 30/20 |
| 2018/0209803 A1* | 7/2018 | Rakah | G01C 21/343 |
| 2019/0042867 A1* | 2/2019 | Chen | G06K 9/00228 |
| 2019/0156566 A1* | 5/2019 | Chen | G01C 21/32 |
| 2019/0325264 A1* | 10/2019 | Keserich | G06N 3/0454 |
| 2019/0340940 A1* | 11/2019 | Elkabetz | G08G 5/0091 |
| 2020/0020226 A1* | 1/2020 | Stenneth | G06K 9/00845 |
| 2020/0160478 A1* | 5/2020 | Ramot | H04W 4/02 |
| 2020/0258223 A1* | 8/2020 | Yip | G06T 7/0012 |

\* cited by examiner

DETERMINING GEOGRAPHICAL MAP FEATURES WITH MULTI-SENSOR INPUT

CROSS-REFERENCE TO RELATED APPLICATIONS

This application claims the benefit of U.S. Provisional Application No. 62/686,086, filed Jun. 17, 2018, the contents of which are incorporated herein by reference in their entirety.

BACKGROUND

This invention relates generally to automated computer prediction and labeling, and particularly to automated predictions for geographical mapping data.

Automatically characterizing data in a geographical map is challenging. The same type of characteristic may present itself in different ways in different sensor modalities that capture real-world data of an area. For example, satellite aerial imagery may capture color and visual information, but many objects like a road and railroad tracks may look the same from a high level. Other modalities, such as LIDAR point cloud data, may reflect height of objects and a point cloud 'landscape' but may not effectively be able to capture certain types of objects, such as overlapping objects. Accordingly, computer models that have attempted to automatically label mapping data with these data sources may not do so effectively. In particular, automatic labeling of road and travel information for such maps is particularly challenging.

SUMMARY

To improve automatic labeling of geographical map data, multiple data modalities are combined as inputs for multiple data tiles used to characterize a region for a geographical map. Each data modality reflects data captured in different ways for a region of a map. For example, one data modality is an aerial image of the region which may be captured by a satellite or plane, another data modality includes LIDAR point cloud data, while another includes location trace data of vehicles and other objects traveling in the region. These different data modalities may be independently captured and then consolidated with parallel processing to improve automatic map labeling, particularly with respect to travel information.

To automatically collect and evaluate information about regions, input data related to each data modality is collected and aggregated for different portions of the region, termed "tiles." Each tile represents a portion of the region, and typically does not overlap with another tile in the region. Each tile may be defined by a set of coordinates specifying the boundary of the tile within the region. These coordinates may be defined according to a geographical positioning system, for example with respect to global positioning satellite coordinates.

For each type of input data (e.g., for each modality), the input data is ingested by the system to identify one or more corresponding tiles. Each tile may be represented as a set of feature vectors, where each vector is capable of receiving one or more data elements for each type of input data. For example, one vector for a data tile may be associated with one or more data elements associated with a "GPS trace" data type.

To process the input data and generate relevant feature vectors for the tiles, each type of data may be separately analyzed in generating relevant feature data for each tile. For many types of input data, the data may be represented as different data records. For example, the location trace data type may include a large number of individual location traces corresponding to individual trips taken by vehicles. Each of these location traces may represent a separate record. Likewise, for an aerial image of a region, each captured pixel may represent a separate "record" to be processed and ingested to data tile(s). When processing the data records for each data type, the locations associated with each record are compared to the locations associated with the data tiles to match the relevant data records to the data tiles. In doing so, the data record may be converted to values for that data type in the feature vector. In certain circumstances, multiple input records may correspond to a single tile. In this case, each input record may generate a separate feature vector for that data type for the tile when processed. The feature vectors for each input record of a given type may be aggregated to determine the feature vector of that type for the tile. For example, many location traces may be combined to reflect the frequency of travel across a given tile in a region. The processing of the data records may occur across multiple systems and be parallelized, since each data record may be individually processed to determine its corresponding tile(s).

By ingesting various types of data, such as aerial imagery, point cloud, and location traces, and effectively aligning this data to the tiles of the region, this data can be used together as feature vectors of the tiles to characterize a geographical map using these different types of sensor data. Accordingly, models can be trained to predict characteristics of the region based on the feature vectors of the tiles in the region. The models may be neural networks that include a set of convolutional layers and de-convolutional layers for generating insights into the map data about the region. Because input data includes additional information beyond images, the resulting automatically predicted map labels are typically more accurate than prior techniques. Since the feature vectors more richly describe the tiles in a region with these various types of input, the models are more effective at labeling the tiles compared to models that attempt to label map regions based only on imagery.

DETAILED DESCRIPTION

Figure 1:
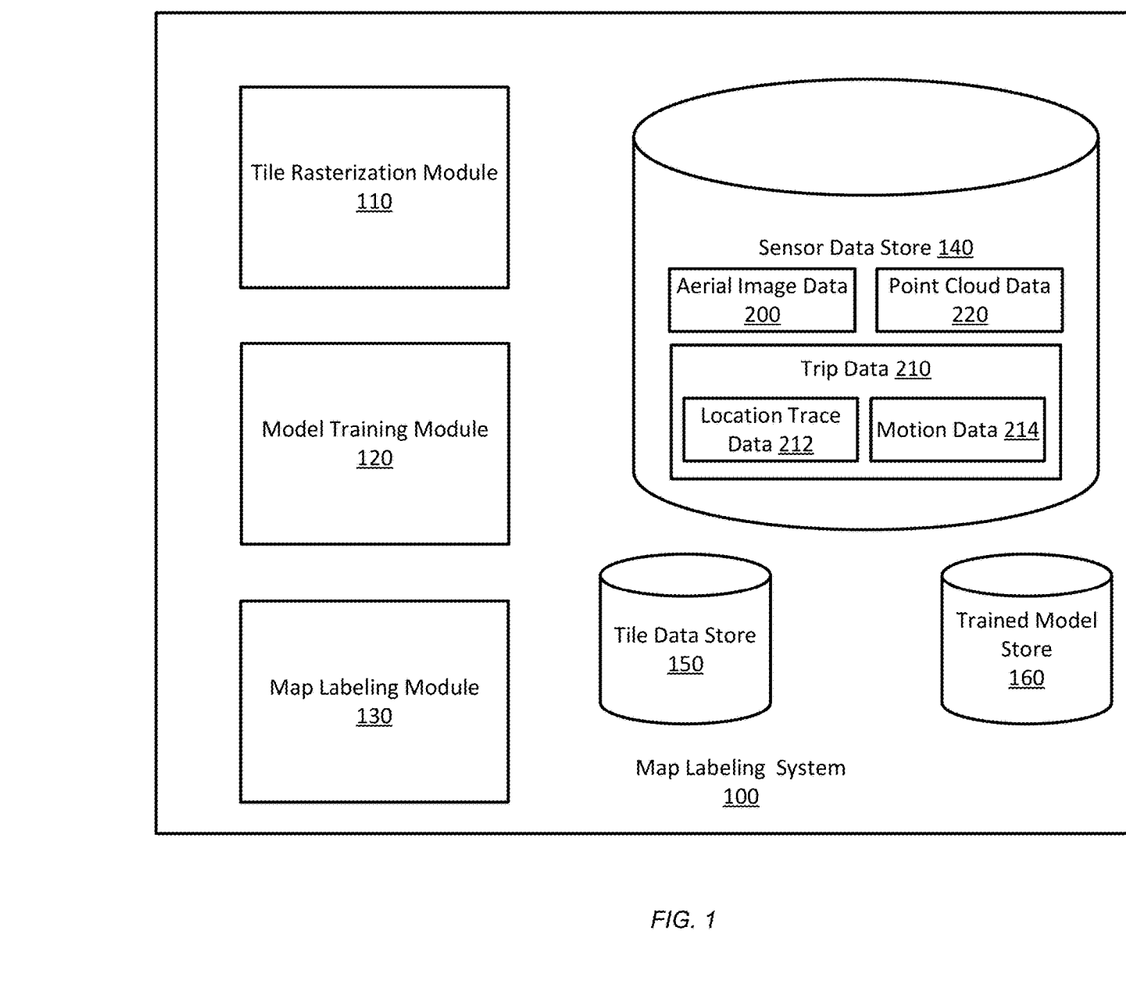
FIG. 1 illustrates example components of a map labeling system.

FIG. 1 illustrates example components of a map labeling system 100. In this example, the map labeling system 100 trains computer models for automatically labeling maps and other geographical regions based on various sensor data capturing the geographical region. The map labeling system 100 includes various modules and data stores for generating data tiles representing parts of a region and using the data tiles to train and apply models for automatically labeling a region. The map labeling system 100 as shown in this example includes a tile rasterization module 110 to ingest data records and generate features for tiles in a region, a model training module 120 for training computer models that can be used to label a region, and a map labeling module 130 that applies trained models to generate labels using tile data for a region. The map labeling system 100 in this example also has a sensor data store 140, a tile data store 150, and a trained model store 160.

To automatically label maps, the map labeling system 100 uses various types of input data as stored by the sensor data store 140. These different data types represent different modalities for sensing a region. These different modalities represent different ways in which sensors in a region may capture information about the region. For example, the different modalities may include aerial image data, point cloud data, and trip data (such as location trace data and motion data). In general, each of these modalities may describe the region in different ways that, when jointly used by the trained model, may improve the ability of the model to automatically label the region. Each modality may thus capture information reflecting different physical characteristics of the region. For example, while an aerial image may describe visible characteristics of the region from an aerial view, a point cloud of a region may describe 3d characteristics of the region such as height and contours of objects in the region.

Aerial image data 200 represents image data captured from a camera or other imaging sensor, typically from an aerial or birds-eye view aimed directly down on a region. For example, aerial image data 200 may be captured from an imaging device on a plane, helicopter, drone, or other flying object, or may be captured by a satellite. This aerial imagery may thus be captured from a very large distance from the region being imaged. Aerial image data 200 may provide color information about the region (e.g., red, blue, and green), but typically presents only a single point of view and may provide no height data. This can make object height, as well as moving objects seen in the aerial images difficult to detect based on aerial image data. In addition, similar objects and structures relevant to road and traffic information may be difficult to distinguish based on aerial data, such as overpasses and underpasses, or when traffic lanes are "stacked" on top of one another, such as at bridges or at airports.

Point cloud data 220 represents data about a region that is described by a data point cloud. The point cloud data 220 represents the region as a set of points each having a location in space. Point cloud data 220 is typically captured by a LIDAR (light detection and ranging) scan of a region, which may capture the location of objects, structures, and contours in the region as represented in the captured set of points. For example, a building may be represented in point cloud data as a set of points that describe each face of the building. While the data points may not be captured with explicit relationships between the points, the point cloud data 220 may also be considered as a "mesh" of the region formed from the scanned data. As one example, point cloud data 220 for a region may be captured by a plane or drone traveling in the region that captures the location and height of objects via the LIDAR scan. In another example, LIDAR systems may also be mounted on vehicles and used to collect point cloud data 220 at street level. As the LIDAR system scans the region, it identifies the depth of the surrounding environment at various points relative to the location of the LIDAR system. In other examples, point cloud data 220 may be collected by other systems, for example via images of a region captured from different perspectives. Based on the different perspectives, the depth of objects viewed in the perspectives may be estimated and used to generate point cloud data 220 of the region. While point cloud data 220 may include object heights, point cloud data 220 may lack the comprehensive aerial image view provided by aerial image data, and may also lack color and movement information.

Trip data 210 represents data that may be captured based on travel of vehicles and other objects in the region. Trip data 210 thus represents travel of objects (that may be associated with pedestrians or vehicles) within a region. In particular, as objects and vehicles move and travel in a region, the objects and vehicles may report sensor data of the objects from location sensors (providing location data 212) or from inertial sensors (providing motion data 214). As one example for obtaining trip data 210, a mapping system may provide directions to vehicles traveling in a region. As vehicles move in the region, the vehicles may report their location and motion data during a trip at various points in time. The location trace data 212 refers to movement data of vehicles in the region, such as the reported location and speed of the vehicle during portions of the trip. Likewise, motion data 214 may also be gathered, for example from an inertial measurement unit (IMU) on the vehicle. Because each location trace data 212 and motion data 214 related to a trip may be reported at a particular time with an associated location (and the reported times may be of various frequencies), the trip data 210 may not be "smooth" with respect to travel through the region in the trip. The location trace data 212 and motion data 214 may thus be captured with respect to individual trips of vehicles through a region and represented by data captured at various points in time.

The sensor data store 140 may include various additional types of data that describe the region, such as weather data. Although the data types described above are obtained from sensors capturing information about the region, additional data may also be included and processed as discussed herein (e.g., to generate tile data and include the additional data types with a feature vector describing the tile). For example, other mapping or labeling data of the region that designates locations of traffic signals may also be included. This data may be derived from sensor data or may be from a map data provider. In some circumstances, although the data types include labeling information (e.g., metadata provided by the data provider indicating the data type), the predictive models may be trained to generate a prediction of the same label, and, for example, to use the data provider's prediction as one input to a model in conjunction with the other data types.

Figure 2:
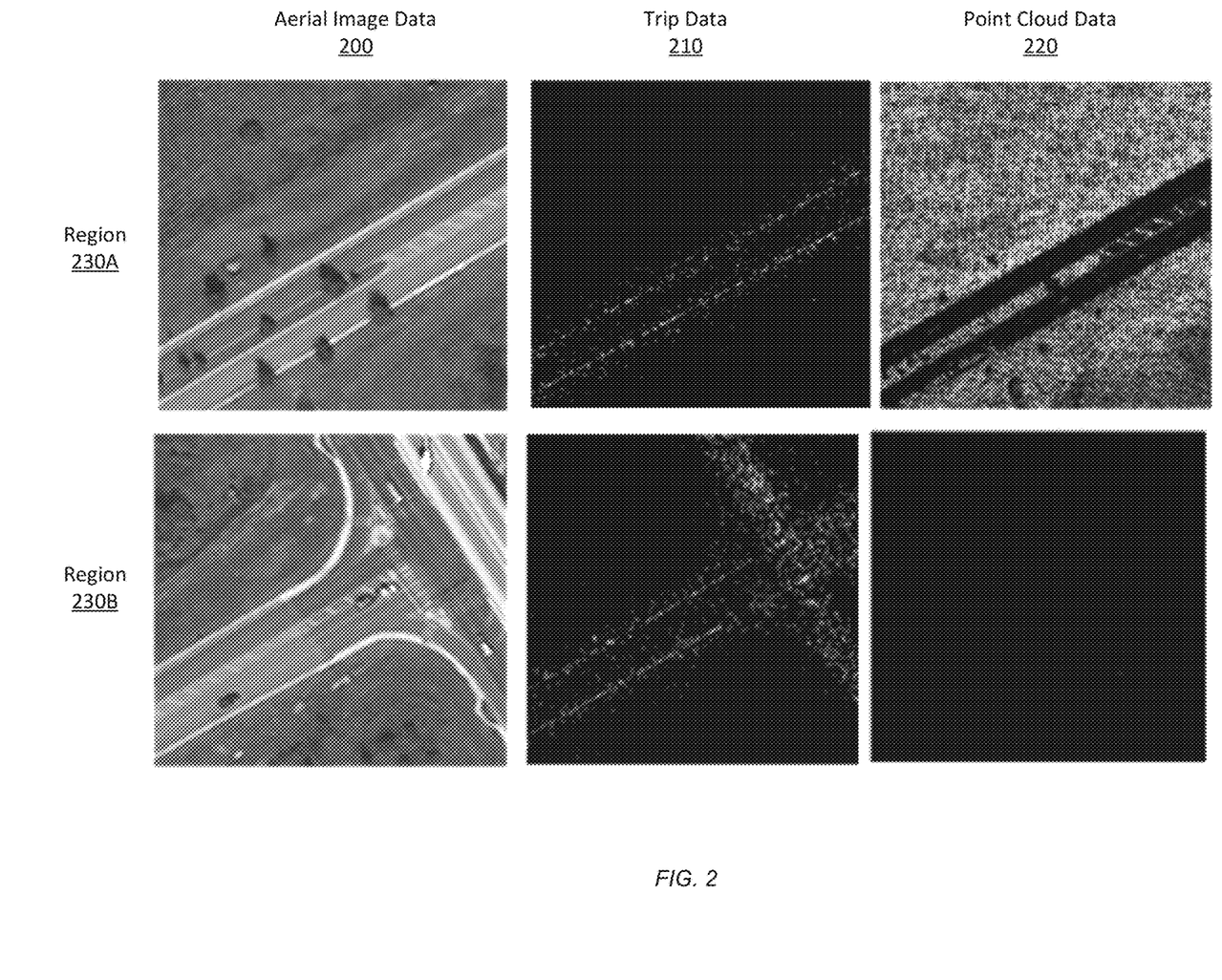
FIG. 2 shows example sensor data visualized for two regions according to one embodiment.

FIG. 2 shows example sensor data visualized for two regions according to one embodiment. This example illustrates aerial data 200, trip data 210, and point cloud data 220 within example regions 230A and 230B. Region 230A illustrates a portion of a road that begins a physical divider between two lanes of the road. Region 230B illustrates an intersection in a portion of a road. As shown in this example, the aerial image data 200 may include an image of each region. As shown in the aerial image data 200 of region 230B, the aerial image data 200 may include additional features that may not be relevant to desired analysis or categorization of the image. For example, the aerial image may include cars and other objects that are only temporarily present in the region. In this example, aerial image data 200 of region 230B includes vehicles at the intersection. To present the trip data 210 as represented in FIG. 2, individual trips in the region are aggregated such that trips in the region are illustrated by points showing reported locations on the trips. In addition, the reported locations for the trip data 210 may be coded for display according to additional characteristics. For example, location points in trip data 210 may have associated motion metadata about a speed the vehicle was moving when the particular location point was recorded. FIG. 2 also illustrates point cloud data 220 for the regions 230A and 230B composed of individual point cloud points that each describe a location and height. In some example embodiments, the height of different points may be represented or visualized using different colors for points at different heights or distances from the sensor. One contrast between the example data types of FIG. 2 is that while the aerial image data 200 appears continuous across the region, the trip data 210 and point cloud data 220 typically represent discrete data points that are not continuous across the region.

Returning to FIG. 1, the tile rasterization module 110 analyzes the sensor data from the sensor data store 140 to process the feature data into feature vectors for a set of tiles in various regions to be analyzed by the map labeling system 100. This processing may also include changing data types which are more discrete (such as trip data 210 and point cloud data 220) to a more continuous representation in the feature vectors for the tiles. Each region to be characterized by the map labeling system is thus represented by a set of tiles. Each region is associated with a set of geographical coordinates for the region. Each tile within a region thus describes a portion of the region with a set of coordinates for the tile. Typically, the set of tiles for a region may divide the region, such that each tile describes a unique set of coordinates for the region. The size of the geographical region for a tile may be determined in various ways. For example, each tile may have a predefined geographical size, such as a square having the size of 1 m². In another example, a region may be divided into a set number of tiles, such as 1000× 1000. As another example, the size of the tiles may be defined based on a data type in the sensor data store. For example, aerial image data of a region is typically comprised of a set of image pixels for the region. The tiles for a region may then be defined to match the image pixels for the region and have coordinates that correspond to the coordinates of the image pixels of the aerial image data.

To determine feature vectors for the tiles, the tile rasterization module 110 accesses data records for each type of sensor data, determines which data tiles each of the processed data records correspond to, and adds the sensor data to a feature vector associated with that sensor data type for the corresponding tiles. For each sensor data type, each tile may be associated with one or more data sets (which may be stored as feature vectors for that data type) from various input data records. For each tile, each sensor data type may then be aggregated to determine the final feature vector for the tile for that data type. For example, after processing the input records, there may be ten trip data records that are associated with a particular tile. The aggregation for trip data records combines these to a single vector of data values to represent the trip data in the feature vector for the tile.

To determine tiles for the various data types, the data types may be rasterized with respect to the coordinates of each data tile. This rasterization may vary according to the type of data. For certain data types, such as aerial image data, the image data may be scaled to the resolution of the data tiles in the region to match the coordinates of the image data with the coordinates of the data tiles. For example, each input pixel in an aerial image may be associated with a coordinate. To process that input pixel, one or more tiles in the region are identified which include the coordinates of the input pixel. In some circumstances, rather than directly matching the coordinates of an image with the input tiles, the aerial image is re-scaled to the scale of the data tiles. This may permit the image data to be smoothed or otherwise blended at the scale of the data tiles for the region.

Similarly, point cloud data may also be scaled with respect to the coordinates of the tiles. Each point cloud point may also relate to one or more of the data tiles, and more than one points in the point cloud may correspond to a given coordinate. For example, the region may include a building, steep hill, cliff, or other structure with a significant vertical gradient. In the point cloud data, these features may be represented by several points in the located on the side of the structure but that correspond to a similar geographical coordinate. Each of these points may thus correspond to the same data tile. Accordingly, when each of the point cloud data points is analyzed and associated with one or more data tiles, the data tiles may initially be associated with multiple point cloud data features, each designating the height of a point cloud point.

Each trip (or record) in the trip data may correspond to reported positions over time for the trip with associated location trace data 212 or motion data 214. In some embodiments, the reported information may directly be used to determine data tiles for a given trip. Alternatively, since the location trace and motion data may not be known at all times for a trip, in some embodiments the trip data 210 for a given trip is analyzed to determine a path between each reported point for the trip. This path may be determined by connecting the reported, timestamped data to convert the point-by-point reported data to a continuous path that represents connections between the reported times. The coordinates for each path along a trip may then be used to identify the data tiles for the region associated with the trip. That is, the trip data may be converted to a path. Between the reported points on the trip, the interpolated data between points for the trip may be used as approximated data for each tile in a path for that trip. When the path intersects with a data tile, the reported point (or points) may thus be used to determine trip data for that tile.

As discussed above, in some embodiments each record in the sensor data store 140 may be identified as relating to one or more data tiles. Each data tile may thus be represented as a collection of vectors for each data type. Each of these data types may also be processed independently, and may be parallelized across multiple systems. For example, the trip records may be separated to multiple processing systems which each process a subset of the trip records to determine corresponding paths for the trip and identify tiles for the trip data. The resulting tile data for each tile may then be joined to determine the relevant data for each tile.

In some embodiments, data for a particular type may also be provided by more than one provider. For example, more than one company may provide imagery 200 or point cloud data 220 for a region, in which case each provider's data may be separately processed and added to the data for relevant tiles. Similarly, more than one image or data scan may have been captured for a region, each of which may be processed as a record for that type to determine tiles relevant to that record. In one embodiment, this different data for a given data type may be processed to generate a feature vector for that record and aggregated as with other data for a tile, permitting the differently-captured data to be incorporated into a feature vector describing the tile across these different sensor data types.

In addition, each type of data may also be aggregated or combined to determine features for that data type for that tile. For example, many trips may be associated with a given data tile. To determine features that describe that data type across the multiple data records associated with a tile, the tile rasterization module 110 may aggregate the data for that data type to summarize the information from the multiple data input records. This aggregation may vary based on the data type. As a few examples, image data 200 may be combined and averaged to determine average color data for a tile, the point cloud data 220 for a tile may be summarized to determine the maximum height represented by any data points associated with the tile, while the trip data may be averaged to determine the average speed of trips in a tile or a count may be taken to determine the total volume of trips associated with that tile. As additional examples, for data which varies over time (e.g., trip data 210 or imagery data 200), the data may be aggregated across various time periods, for example aggregating each hour of trip data, which may also be used to describe data on a periodic basis (e.g., Monday from 1:00-2:00 a.m. across multiple weeks). Likewise, to measure volume, trip data 210 may also be binned according to speed in the tile, for example binning the data as 0-10, 11-30, or 31+ miles (or kilometers) per hour. The temporal aggregation of data may thus assist in training and applying computer models which attempt to describe characteristics that vary across time in the region. In addition, because records may be processed and matched to tiles independently, the data records may be processed in parallel across multiple systems to identify tile data. Likewise, the aggregation of tile data for various data types may also be performed in parallel by different systems.

The tile rasterization module 110 may thus generate feature vectors to describe tiles for map regions and store the data in tile data store 150. These feature vectors describing tiles by the various types of input sensor data may be used to train and apply models to automatically characterize map data.

Figure 3:
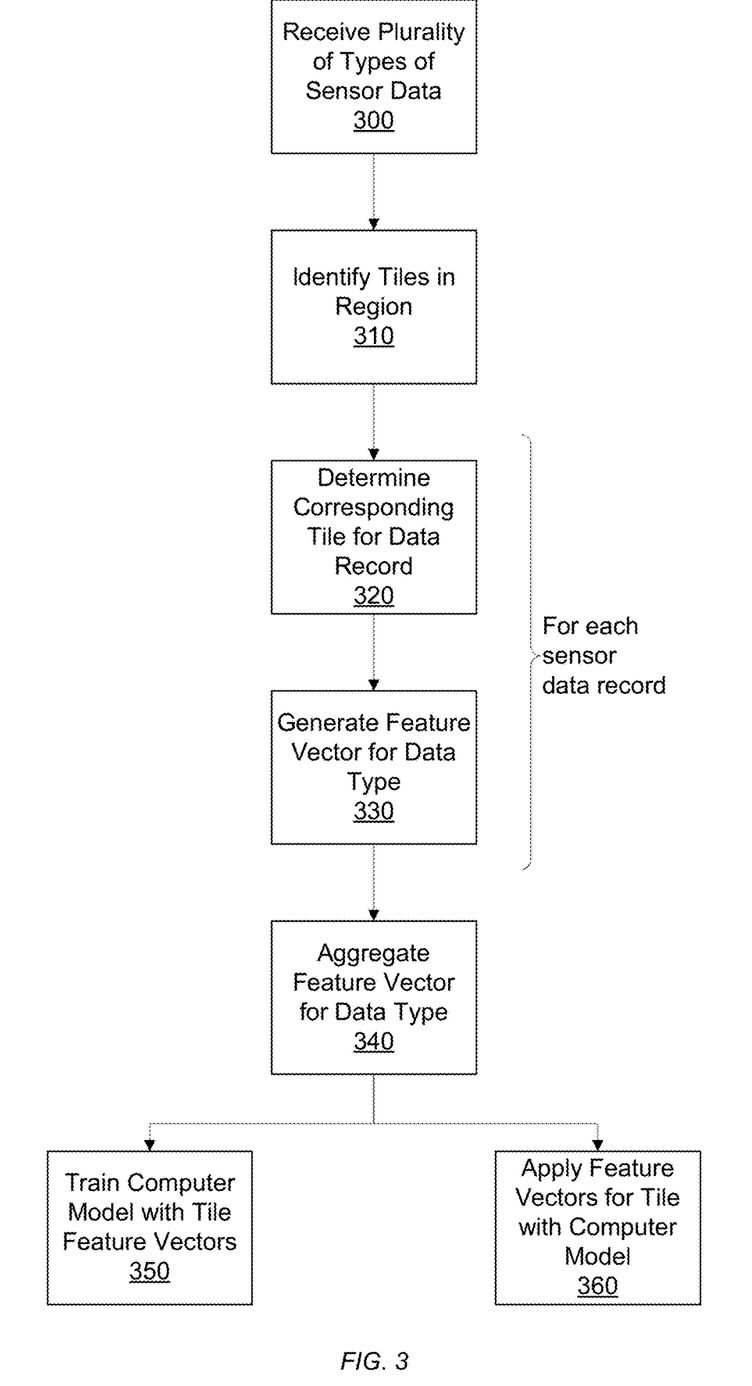
FIG. 3 illustrates a process for processing sensor data for data tiles for use with automatic labeling of map regions, according to one embodiment.

FIG. 3 illustrates a process for processing sensor data for data tiles for use with automatic labeling of map regions, according to one embodiment. This process may be performed by various components of the map labeling system 100. The system may initially receive 300 a plurality of types of sensor data describing various regions. This sensor data may represent captured data of a region as discussed above. To process the sensor data types, the map labeling system 100 identifies 310 tiles for the region that designate portions of the region, such as particular coordinates that together make up the region. For each data type the records may be processed to determine features for each tile by determining 320 a corresponding tile for each data record (which may include interpolation with respect to other data records) and generating 330 a feature vector for that record. After processing the input records to determine corresponding tiles for the records, the data related to each tile may be aggregated 340 to generate a feature vector for the tile that includes available information for each data type.

These feature vectors associated with tiles in a region may then be used to train 350 a computer model for labeling map data and may be applied 360 as input to trained computer models to make predictions about the map based on the feature vectors for a region.

Returning to FIG. 1, The model training module 120 trains computer models based on the tile feature vector data.

The model training module 120 may train various types of computer models based on the desired type of analysis for the region. To use the tile data, the computer model may combine a set of tiles, e.g., to describe a region of a given size for the computer model. For example, a region may be provided to the model having a given dimension such as 400×400 tiles, or 1,600×1,600 tiles, and so forth. When the tile size corresponds to the resolution of an image (e.g., an aerial image), the input size of the computer model may match the resolution of such images. Typically, the computer models may include neural networks that include convolutional layers, pooling layers, deconvolutional layers, etc., that analyze the region by analyzing individual tiles in relation to other tiles near that tile. Although "stacking" various data types, because the data types are converted to the same tiles, these data types can be jointly analyzed by the same network, which may perform spatial processing with such layers.

To train the models, the model training module 120 may retrieve training data for regions having labeled data to be predicted. The tile data for the labeled regions may be used as the inputs for which the models are trained to learn the labeled output of the training data.

After training, the trained models may be stored in the trained model store 160. To predict characteristics of a region, the map labeling module 130 applies tile data for a region to a trained computer model from the trained model store 160. The map labeling module 130 assembles the tile data for the region to be labeled and provides the tile data to the desired model, which provides a prediction of the appropriate label for portions of the region based on the tile data.

Figure 4:
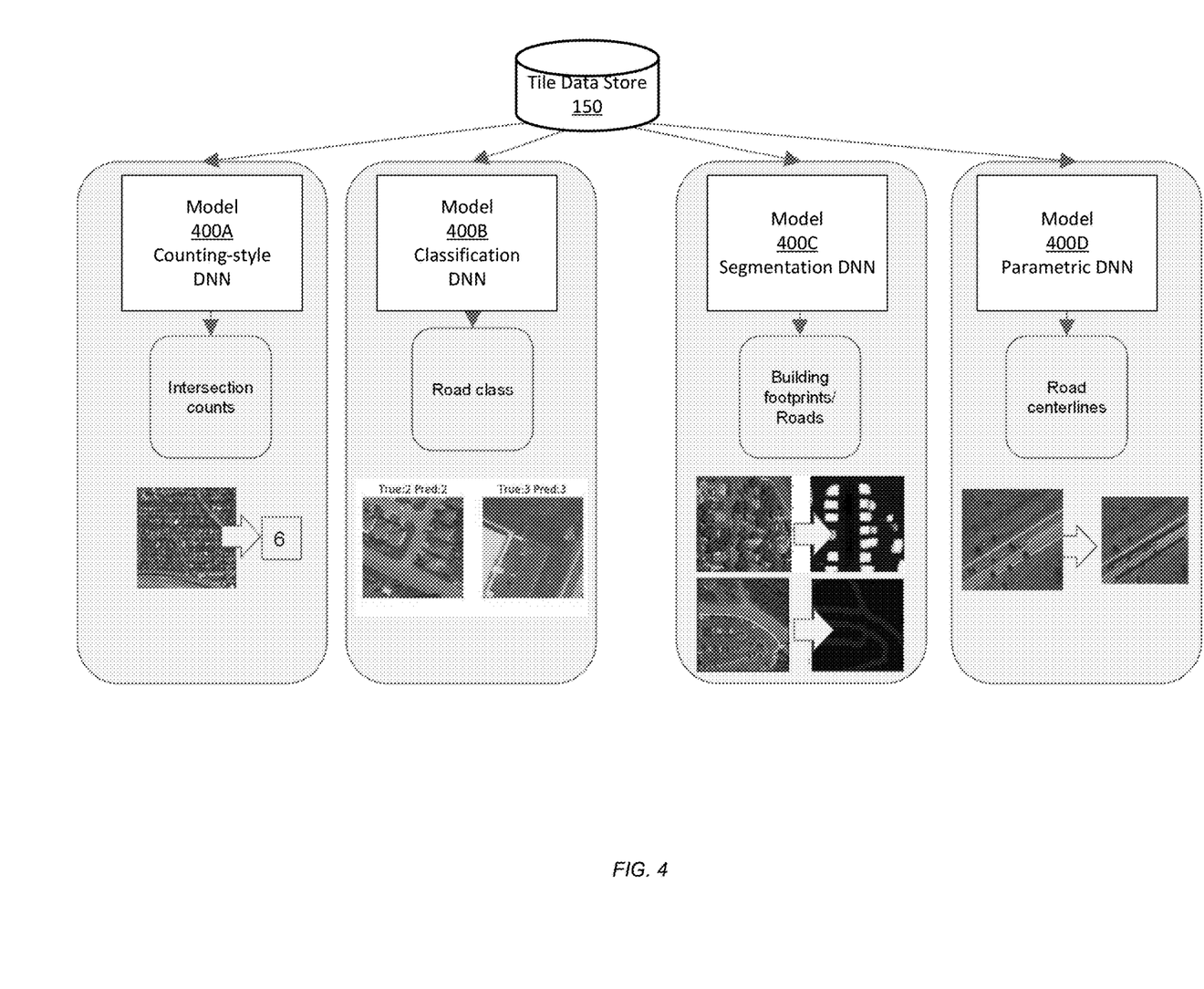
FIG. 4 shows example models 400 that may be trained and improved using the feature vectors associated with tiles and multiple sensor data types as discussed herein.

FIG. 4 shows example models 400 that may be trained and improved using the feature vectors associated with tiles and multiple sensor data types as discussed herein. As shown in FIG. 4, these various models may include neural networks such as counting networks, classification networks, segmentation networks, and parametric networks, each of which may be improved by the data tiles having features as discussed. For example, a model 400A is a counting-style neural network that predicts intersection counts based on the tile data for a region. Model 400B is a classification neural network that predicts a class of road (e.g., minor road, major road, highway, etc.) based on the tile data for a region. Model 400C is a segmentation neural network that predicts which tiles contain certain types of objects, such as building footprints or roads based on the tile data for a region. Model 400D is a parametric neural network that may predict, for example, centerlines of roads in a tile.

Figure 5:
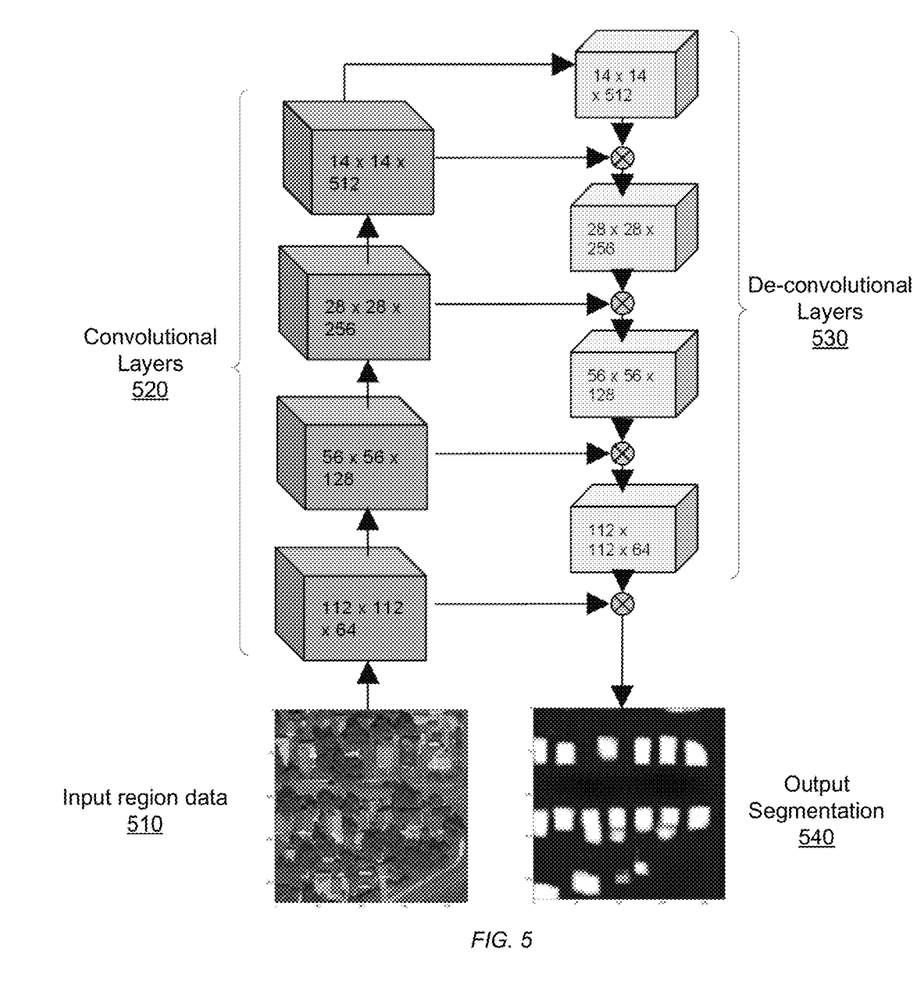
FIG. 5 illustrates one example network model improved by this approach.

FIG. 5 illustrates one example network model improved by this approach. This example network is a segmentation model that attempts to output segmentation of the input region and designate portions of the image that correspond to the outlines of buildings. This is typically a challenging problem because each type of sensor data alone may include partial information with respect to the desired output of building segmentation. In this example, the input region data 510 includes the tiles selected for a region and the feature vectors for those tiles that describe the tiles with respect to a plurality of data types, such as aerial imagery 200, point cloud data 220, and trip data 210. In this example, the segmentation network includes a set of convolutional layers 520 and de-convolutional layers 530 for generating deeper insights of the map data. Training for this process may include training the weights between each layer of the network, for example to determine a weighing for various kernels that process the data tiles at each stage. In some examples, the training directly trains the kernels themselves. Because the data includes additional information such as trip data and point cloud data, the resulting automatically-predicted segmentation 540 is typically more accurate with fewer false positives relative to prior techniques.

Figure 6:
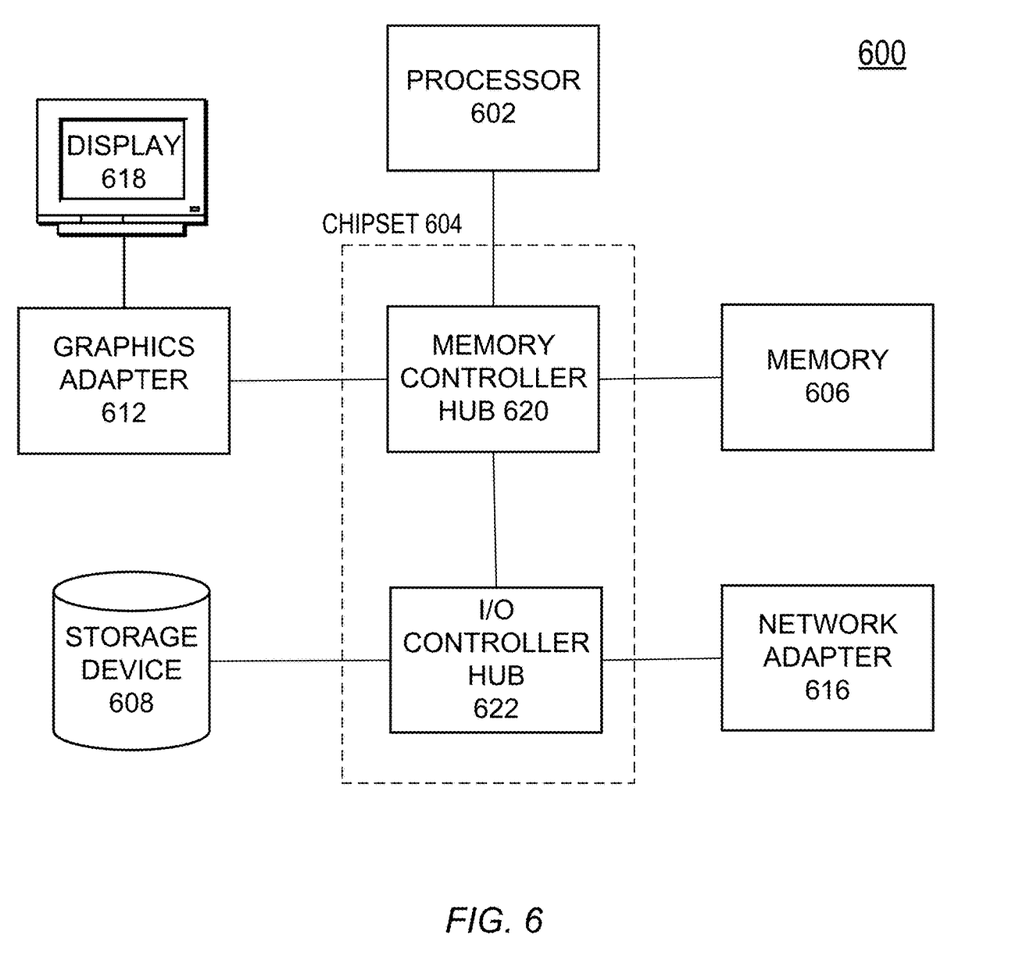
FIG. 6 is a high-level block diagram illustrating physical components of a computer 600 used as part or all of the map labeling system 100, according to one embodiment.

FIG. 6 is a high-level block diagram illustrating physical components of a computer 600 used as part or all of the map labeling system 100, according to one embodiment. Illustrated are at least one processor 602 coupled to a chipset 604. Also coupled to the chipset 604 are a memory 606, a storage device 608, a graphics adapter 612, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The graphics adapter 612 displays images and other information on the display 618. The network adapter 616 couples the computer 600 to a local or wide area network.

A computer 600 can have different and/or other components than those shown in FIG. 6. In addition, the computer 600 can lack certain illustrated components. In one embodiment, a computer 600 such as a server or smartphone may lack a graphics adapter 612, and/or display 618, as well as a keyboard or pointing device. Moreover, the storage device 608 can be local and/or remote from the computer 600 (such as embodied within a storage area network (SAN)).

The computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter.

Accordingly, the disclosure of the present invention is intended to be illustrative, but not limiting, of the scope of the invention.

What is claimed is:

1. A method for automatically labeling a region of a map, the method comprising: receiving a plurality of types of sensor data for the region, each type of sensor data being a different data modality capturing information about the region; identifying a plurality of tiles specifying boundaries within the region; generating a feature vector for each tile in the plurality of tiles, the feature vector describing the plurality of types of sensor data within the boundaries of the tile, wherein generating a feature vector for each tile in the plurality of tiles comprises: for at least one type of sensor data having a set of sensor records: processing each sensor record for the type of sensor data by identifying at least one tile of the plurality of tiles corresponding to the sensor record and adding sensor record data to the feature vector associated with the identified at least one tile; and aggregating the sensor records for each tile in the plurality of tiles with an aggregation function based on the data type of the sensor records; and applying a computer model to determine a characteristic of the plurality of tiles, wherein the computer model receives the feature vector describing the plurality of types of sensor data.

2. The method of claim 1, wherein processing each sensor record comprises processing different subsets of the set of sensor records at a plurality of processing systems.

3. The method of claim 1, wherein the types of sensor data include two or more of: aerial imagery, point cloud height data, trip position trace data, trip motion data, and map data.

4. The method of claim 1, wherein each tile specifies boundaries within the region by specifying coordinates defining a portion of the region.

5. The method of claim 1, wherein at least one of the plurality of types of sensor data for the region is not image data.

6. The method of claim 1, wherein applying a computer model to determine a characteristic of a tile comprises providing the feature vector for the tile to a neural network.

7. A non-transitory computer-readable storage medium storing computer program instructions executable by one or more processors of a system to perform steps comprising: receiving a plurality of types of sensor data for the region, each type of sensor data being a different data modality capturing information about the region; identifying a plurality of tiles specifying boundaries within the region; generating a feature vector for each tile in the plurality of tiles, the feature vector describing the plurality of types of sensor data within the boundaries of the tile, wherein generating a feature vector for each tile in the plurality of tiles comprises: for at least one type of sensor data having a set of sensor records: processing each sensor record for the type of sensor data by identifying at least one tile of the plurality of tiles corresponding to the sensor record and adding sensor record data to the feature vector associated with the identified at least one tile; and aggregating the sensor records for each tile in the plurality of tiles with an aggregation function based on the data type of the sensor records; and applying a computer model to determine a characteristic of the plurality of tiles, wherein the computer model receives the feature vector describing the plurality of types of sensor data.

8. The non-transitory computer-readable storage medium of claim 7, wherein processing each sensor record comprises processing different subsets of the set of sensor records at a plurality of processing systems.

9. The non-transitory computer-readable storage medium of claim 7, wherein the types of sensor data include two or more of: aerial imagery, point cloud height data, trip position trace data, trip motion data, and map data.

10. The non-transitory computer-readable storage medium of claim 7, wherein each tile specifies boundaries within the region by specifying coordinates defining a portion of the region.

11. The non-transitory computer-readable storage medium of claim 7, wherein at least one of the plurality of types of sensor data for the region is not image data.

12. The non-transitory computer-readable storage medium of claim 7, wherein applying a computer model to determine a characteristic of a tile comprises providing the feature vector for the tile to a neural network.

13. A computer system comprising: one or more computer processors for executing computer program instructions; and a non-transitory computer-readable storage medium storing instructions executable by the one or more computer processors to perform steps comprising: receiving a plurality of types of sensor data for the region, each type of sensor data being a different data modality capturing information about the region; identifying a plurality of tiles specifying boundaries within the region; generating a feature vector for each tile in the plurality of tiles, the feature vector describing the plurality of types of sensor data within the boundaries of the tile, wherein generating a feature vector for each tile in the plurality of tiles comprises: for at least one type of sensor data having a set of sensor records: processing each sensor record for the type of sensor data by identifying at least one tile of the plurality of tiles corresponding to the sensor record and adding sensor record data to the feature vector associated with the identified at least one tile; and aggregating the sensor records for each tile in the plurality of tiles with an aggregation function based on the data type of the sensor records; and applying a computer model to determine a characteristic of the plurality of tiles, wherein the computer model receives the feature vector describing the plurality of types of sensor data.

14. The computer system of claim 13, wherein processing each sensor record comprises processing different subsets of the set of sensor records at a plurality of processing systems.

15. The computer system of claim 13, wherein the types of sensor data include two or more of: aerial imagery, point cloud height data, trip position trace data, trip motion data, and map data.

16. The computer system of claim 13, wherein each tile specifies boundaries within the region by specifying coordinates defining a portion of the region.

17. The computer system of claim 13, wherein at least one of the plurality of types of sensor data for the region is not image data.

* * * * *